(12) United States Patent
Edwards

(10) Patent No.: US 9,367,194 B2
(45) Date of Patent: Jun. 14, 2016

(54) SYSTEMS FOR DISPLAYING IMAGES

(71) Applicant: INNOLUX CORPORATION, Jhu-Nan, Miao-Li County (TW)

(72) Inventor: Martin John Edwards, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 0 days.

(21) Appl. No.: 14/691,529

(22) Filed: Apr. 20, 2015

(65) Prior Publication Data

US 2015/0227244 A1 Aug. 13, 2015

Related U.S. Application Data

(63) Continuation of application No. 12/841,123, filed on Jul. 21, 2010.

(51) Int. Cl.
*G06F 3/045* (2006.01)
*G06F 3/047* (2006.01)
*G06F 3/044* (2006.01)
*G09G 5/00* (2006.01)

(52) U.S. Cl.
CPC ............... *G06F 3/047* (2013.01); *G06F 3/044* (2013.01); *G09G 5/00* (2013.01); *G09G 2300/0426* (2013.01)

(58) Field of Classification Search
CPC ..................................................... G06F 3/041
See application file for complete search history.

(56) References Cited

U.S. PATENT DOCUMENTS

| | | | | |
|---|---|---|---|---|
| 6,297,811 B1 * | 10/2001 | Kent | ........................ | G06F 3/044 178/18.01 |
| 2007/0229466 A1 | 10/2007 | Peng et al. | | |
| 2007/0229468 A1 * | 10/2007 | Peng | ........................ | G06F 3/044 345/173 |
| 2008/0007534 A1 * | 1/2008 | Peng | ........................ | G06F 3/044 345/173 |
| 2009/0255737 A1 * | 10/2009 | Chang | ...................... | G06F 3/044 178/18.06 |
| 2010/0007616 A1 | 1/2010 | Jang | | |
| 2010/0149116 A1 * | 6/2010 | Yang | ...................... | G06F 3/0416 345/173 |

* cited by examiner

*Primary Examiner* — Nicholas Lee
*Assistant Examiner* — James M Holland
(74) *Attorney, Agent, or Firm* — Liu & Liu

(57) ABSTRACT

A system for displaying images is provided. The system includes a capacitive touch sensor device includes a dielectric layer having a sensing area and covered by a transparent substrate. A plurality of series of first sense electrodes and a plurality of series of second sense electrodes are embedded in a first level of the dielectric layer and within the sensing area. Each series of first sense electrodes extends along a first direction and each series of second sense electrodes extends along a second direction substantially different from the first direction. A plurality of signal lines are embedded in a second level lower than the first level of the dielectric layer and extends along the second direction. Each signal line is correspondingly and electrically connected to one of the plurality of series of first sense electrodes.

20 Claims, 6 Drawing Sheets

SYSTEMS FOR DISPLAYING IMAGES

CROSS REFERENCE TO RELATED APPLICATIONS

This application is a Continuation of pending U.S. patent application Ser. No. 12/841,123 filed on Jul. 21, 2010 and entitled "Systems for displaying images".

BACKGROUND OF THE INVENTION

1. Field of the Invention

The invention relates to a touch panel display technology, and in particular to a capacitive touch sensor device for a touch panel display.

2. Description of the Related Art

A touch sensor device is typically integrated with a flat panel display device (such as an LCD, AMOLED or the like) to form a touch panel display. Touch panel displays are typically mounted on electronic devices, such as portable personal computers, personal digital assistants (PDAs), electronic books, projectors, mobile phones, and the like. The touch panel display is capable of conducting input functions by a finger, a stylus, a pen, or the like. Generally, touch panel displays are divided into resistive type, capacitive type, acoustic wave type, and optical type touch panel displays according to the sensing method applied, in which the capacitive touch panel display has gained an increasing amount of attention and popularity because it has good touch sensitivity and structural stability.

FIG. 1 illustrates a plan view of an arrangement of sense electrodes for a conventional capacitive touch sensor device. The capacitive touch sensor device 100 typically includes a plurality of series of sense electrodes 101 and a plurality of series of sense electrodes 103 underlying the plurality of series of sense electrodes 101, in which each series of sense electrodes 101 is perpendicular to each series of sense electrodes 103 as viewed from a top-view perspective. Each series of sense electrodes 101 is connected to a connection line 101a and each series of sense electrodes 103 is connected to a connection line 103a. The connections lines 101a and 103a are disposed on a border region that is typically on two orthogonal sides of the sensor device 100, such that the series of sense electrodes 101 can be electrically connected to external circuits (not shown) by the connections lines 101a and 103a.

For some touch panel displays, particularly those applied in mobile devices, such as mobile phones and PDAs, it is desirable to minimize the width of the border region around the display to reduce dimensions thereof. The connection lines in the border region, however, are typically disposed on two orthogonal sides of the touch panel display, which fixes the width of the border region, making reduction of the dimensions of the border region very difficult.

Accordingly, there exists a need in the art for development of a touch sensor device, capable of reducing the width of the border region.

BRIEF SUMMARY OF THE INVENTION

A detailed description is given in the following embodiments with reference to the accompanying drawings. Systems for displaying images are provided. An exemplary embodiment of a system for displaying images comprises a capacitive touch sensor device comprising a dielectric layer having a sensing area and covered by a transparent substrate. A plurality of series of first sense electrodes and a plurality of series of second sense electrodes are embedded in a first level of the dielectric layer and within the sensing area. Each series of first sense electrodes extends along a first direction and each series of second sense electrodes extends along a second direction substantially different from the first direction. A plurality of signal lines are embedded in a second level lower than the first level of the dielectric layer and extends along the second direction. Each signal line is correspondingly and electrically connected to one of the plurality of series of first sense electrodes.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1:
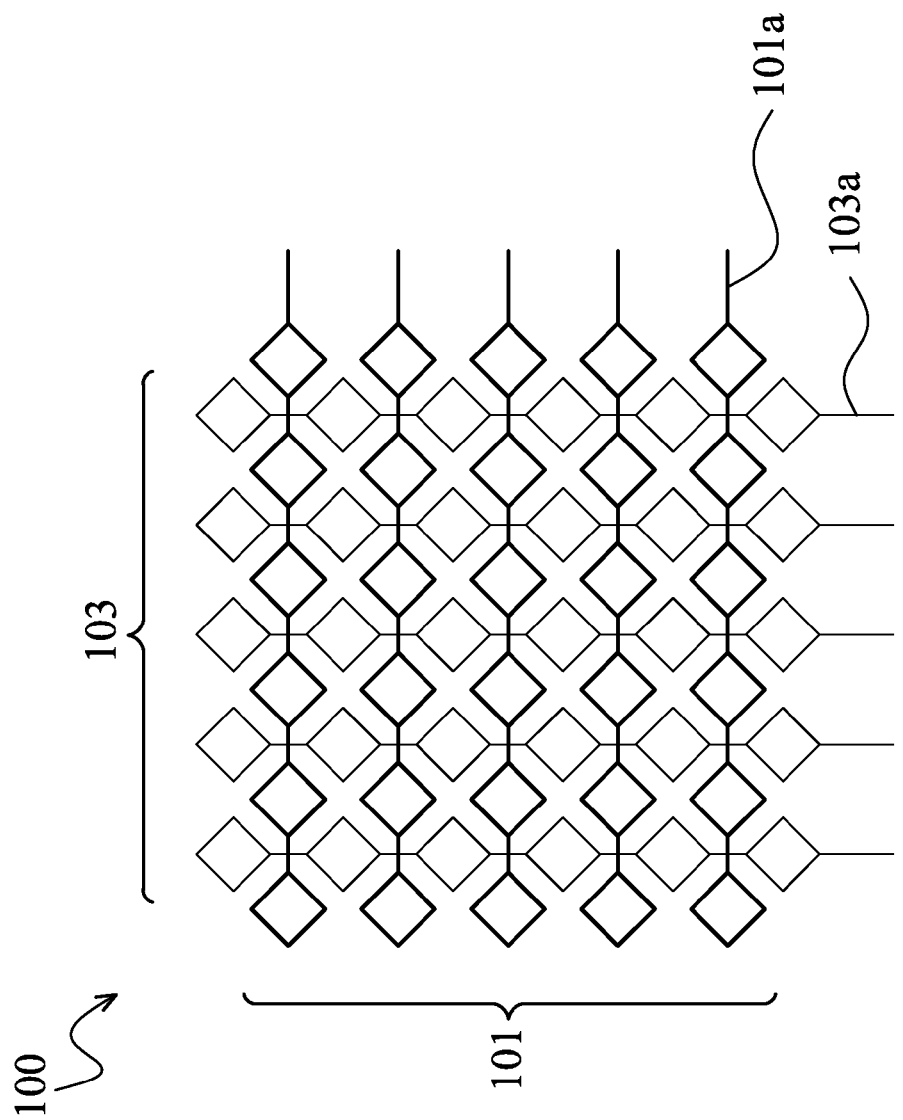
FIG. 1 is a plan view of an arrangement of sense electrodes for a conventional capacitive touch sensor device.
Figure 2A:
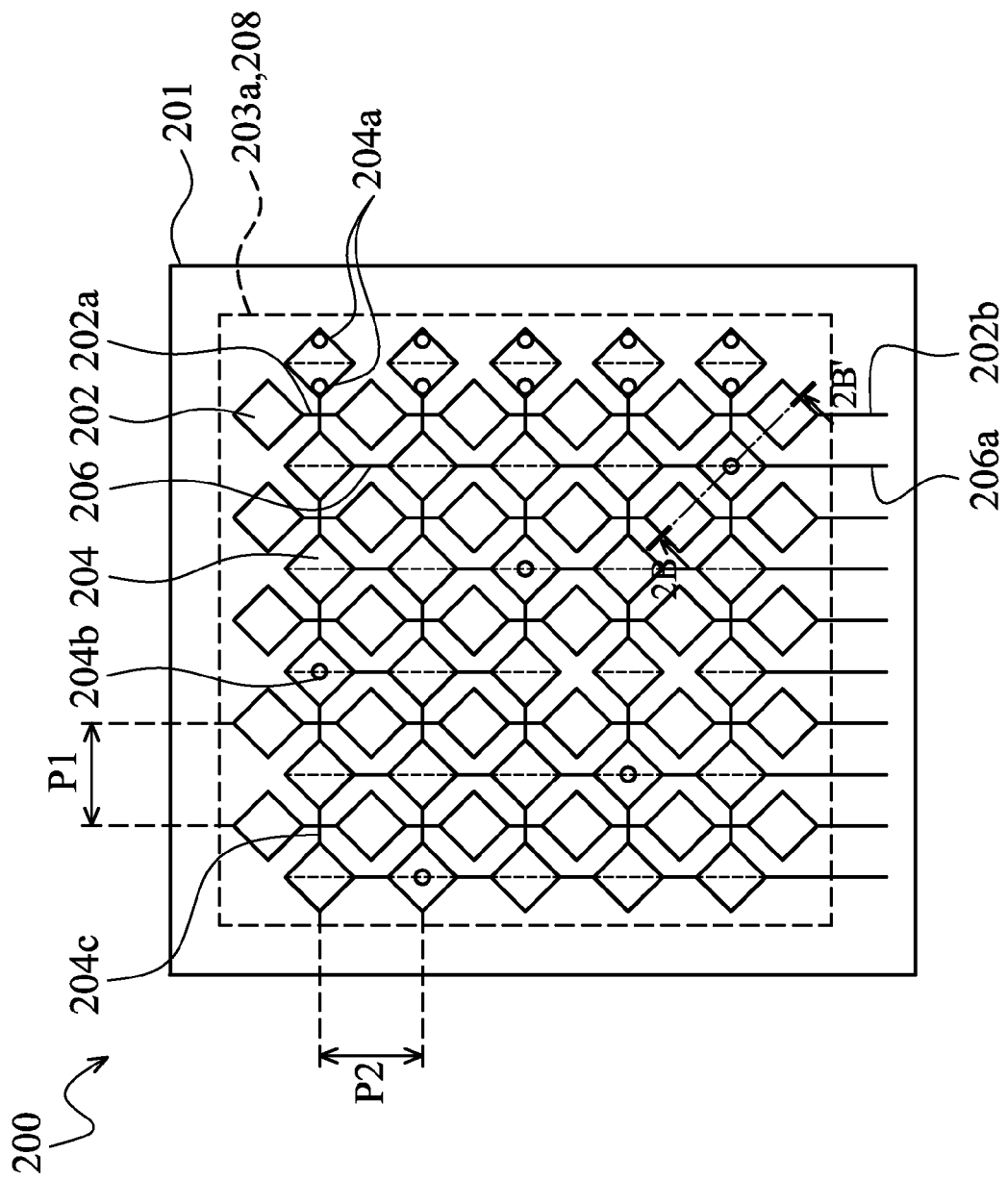
FIG. 2A is a plan view of an embodiment of a system for displaying images including a capacitive touch sensor device according to the invention.
Figure 2B:
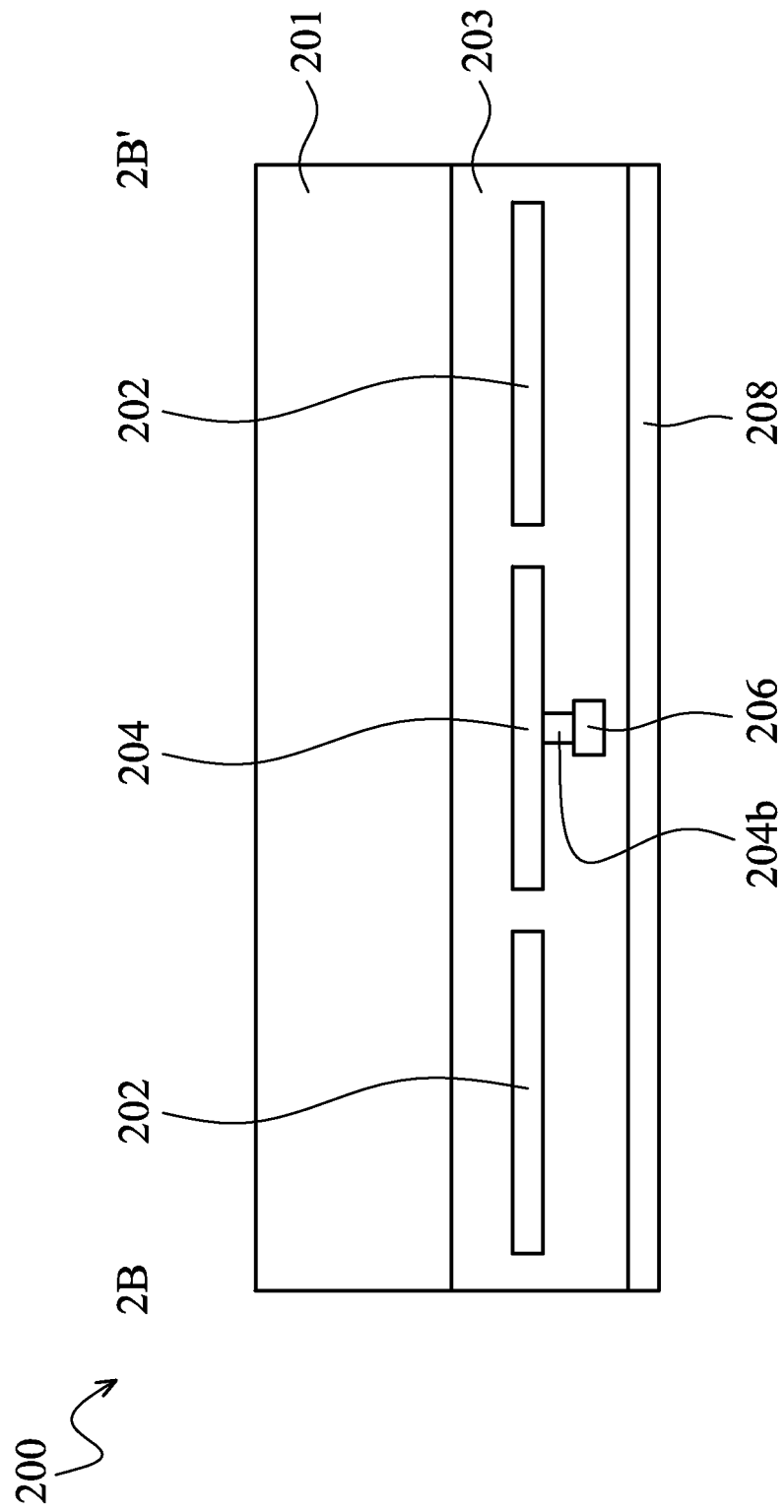
FIG. 2B is a cross section along 2B-2B' line shown in FIG. 2A.

Systems for displaying images are provided. Referring to FIGS. 2A and 2B, in which FIG. 2A is a plan view of an embodiment of a system for displaying images including a capacitive touch sensor device 200 according to the invention and FIG. 2B is the cross section along 2B-2B' line shown in FIG. 2A. In the embodiment, the capacitive touch sensor device 200 comprises a transparent substrate 201, a dielectric layer 203, a plurality of series of first sense electrodes 204, a plurality of series of second sense electrodes 202, and a plurality of signal lines 206. The transparent substrate 201 is directly touched by an input means, such as a finger, a stylus, a pen, or the like. The transparent substrate 201 may be comprised of glass, quartz, or other flexible or inflexible polymer transparent materials.

The dielectric layer 203 (shown in FIG. 2B) is covered by the transparent substrate 201 and has a sense area 203a (shown in FIG. 2A) for disposing sense electrodes. In the embodiment, the dielectric layer 203 may comprise a single layer, such as a silicon oxide layer, silicon nitride layer or other transparent insulating polymer layer, or multiple layers, such as stacked silicon oxide layers, silicon nitride layers, other transparent insulating polymer layers, or combination thereof.

The plurality of series of first sense electrodes 204 and the plurality of series of second sense electrodes 202 are embedded in a first level of the dielectric layer 203 and within the sensing area 203a. In the embodiment, each series of first sense electrodes 204 extends along a first direction and each series of second sense electrodes 202 extends along a second direction different from the first direction. For example, the first direction is parallel to a horizontal direction with respect to FIG. 2A, and the second direction is parallel to a vertical direction with respect to FIG. 2A, such that each series of first sense electrodes 204 is substantially perpendicular to each series of second sense electrodes 202. In some embodiments, the second direction may not be perpendicular to the first direction. In the embodiment, each series of first sense electrodes 204 and each series of second sense electrodes 202 may be formed by patterning the same transparent conductive layer, such as an indium tin oxide (ITO) or indium zinc oxide (IZO) layer using lithography and etching processes. Moreover, two adjacent second electrodes 202 in the same series of second sense electrodes 202 are connected to each other by a connection portion 202a that is embedded in the first level of the dielectric layer 203 and is formed of the same transparent conductive layer as the series of second sense electrodes 202. Two adjacent first electrodes 204 in the same series of first sense electrodes 204 are connected to each other by two interconnects (e.g. conductive plugs/vias) 204a and one connection portion 204c, wherein the connection portion 204c is embedded in a second level lower than the first level of the dielectric layer 203 and the interconnects 204a are disposed between the first and second level of the dielectric layer 203 for electrically connecting the corresponding connection portion 204c. Note that two interconnects 204a are disposed under each first sense electrode 204. In order to simplify and clearly exhibit the diagram, only some interconnects 204a are depicted. In one embodiment, the connection portion 204c is formed of a transparent conductive layer (such as an ITO or IZO layer) which is different from the layer used for formation of the series of first sense electrodes 204.

The plurality of signal lines 206 are embedded in the second level of the dielectric layer 203 and extend along the second direction. In one embodiment, the plurality of signal lines 206 and the connection portions 204c may be formed by patterning the same transparent conductive layer, such as an ITO or IZO layer using lithography and etching processes. In the embodiment, the plurality of signal lines 206 and the plurality of series of second sense electrodes 202 are alternately arranged as viewed from a top-view perspective, such that only one signal line 206 is disposed between the adjacent series of second sense electrodes 202. As a result, the signal lines 206 can be uniformly arranged over the sensing area 203a; thereby minimizing the visibility of the signal lines 206. In the case where one signal line 206 is disposed between the adjacent series of second sense electrodes 202, the number of the plurality of series of first sense electrodes 204 may be one less than that of the plurality of series of second sense electrodes 202. Alternatively, the number of the plurality of series of first sense electrodes 204 may be one more than or equal to that of the plurality of series of second sense electrodes 202.

Each signal line 206 is correspondingly and electrically connected to one of the plurality of series of first sense electrodes 204. For example, each signal line 206 passes under one first sense electrode 204 in each series of first electrodes 204. Moreover, each signal line 206 is electrically connected to the corresponding series of first sense electrodes 204 by an interconnect (e.g. a conductive plug/via) 204b. These interconnects 204b may be visible and make errors in the capacitance measurements if they are clustered together or arranged in a line. In one embodiment, the interconnects 204b for each signal line 206 and the corresponding series of first sense electrodes 204 are not arranged in a line and are distributed over the sensing area 203a as viewed from a top-view perspective to minimize the visibility of the interconnects 204b and prevent errors in capacitance measurements.

A common electrode layer 208 is embedded in a third level lower than the second level of the dielectric layer 203 and corresponds to the sensing area 203a. Namely, the common electrode layer 208 substantially overlaps the entire sensing area 203a. In one embodiment, the common electrode layer 208 may be formed of a transparent conductive layer (such as an ITO or IZO layer) different from that for formation of the first and second sense electrodes 204 and 202 and the signal lines 206. In the embodiment, the common electrode layer 208 and/or the plurality of first sense electrodes 204 may be electrically connected to a ground or a low impedance electrode. As a result, the presence of the input means, such as a finger, a stylus, a pen, or the like, above the signal line(s) 206 has little effect on the capacitance associated with the signal line(s) 206, and the capacitances between the plurality of the signal lines 206 and the plurality of series of second sense electrodes 202 can be reduced. Note that changes in these capacitances may produce errors in the output of the touch sensor device 200.

A plurality of first connection lines 206a corresponds to the plurality of signal lines 206 and a plurality of second connection lines 202b corresponds to the plurality of series of second sense electrodes 202. In the embodiment, each first connection line 206a extends from the corresponding signal line 206 to the outside of the sensing area 203a for electrically connecting the corresponding series of first sense electrode 204 to external circuits (not shown). Moreover, each second connection line 202b extends from the corresponding series of second sense electrodes 202 to the outside of the sensing area 203a for electrically connecting the corresponding series of second sense electrode 202 to external circuits (not shown). In one embodiment, the first connection lines 206a may be formed of the same transparent conductive layer as that for formation of the signal line 206. Also, the second connection line 202b may be formed of the same transparent conductive layer as that for formation of the second sense electrode 202. In the embodiment, the plurality of first connection lines 206a and the plurality of second connection lines 202b are located at the same side of the sensing area 203. According to the foregoing embodiments, since the connection lines for electrically connecting the sense electrodes to external circuits can be arranged at the same side of the sense area of the touch sensor device, the width of the border region around the touch panel display can be reduced, and thus the dimensions of a touch panel display can also be reduced.

Figure 3:
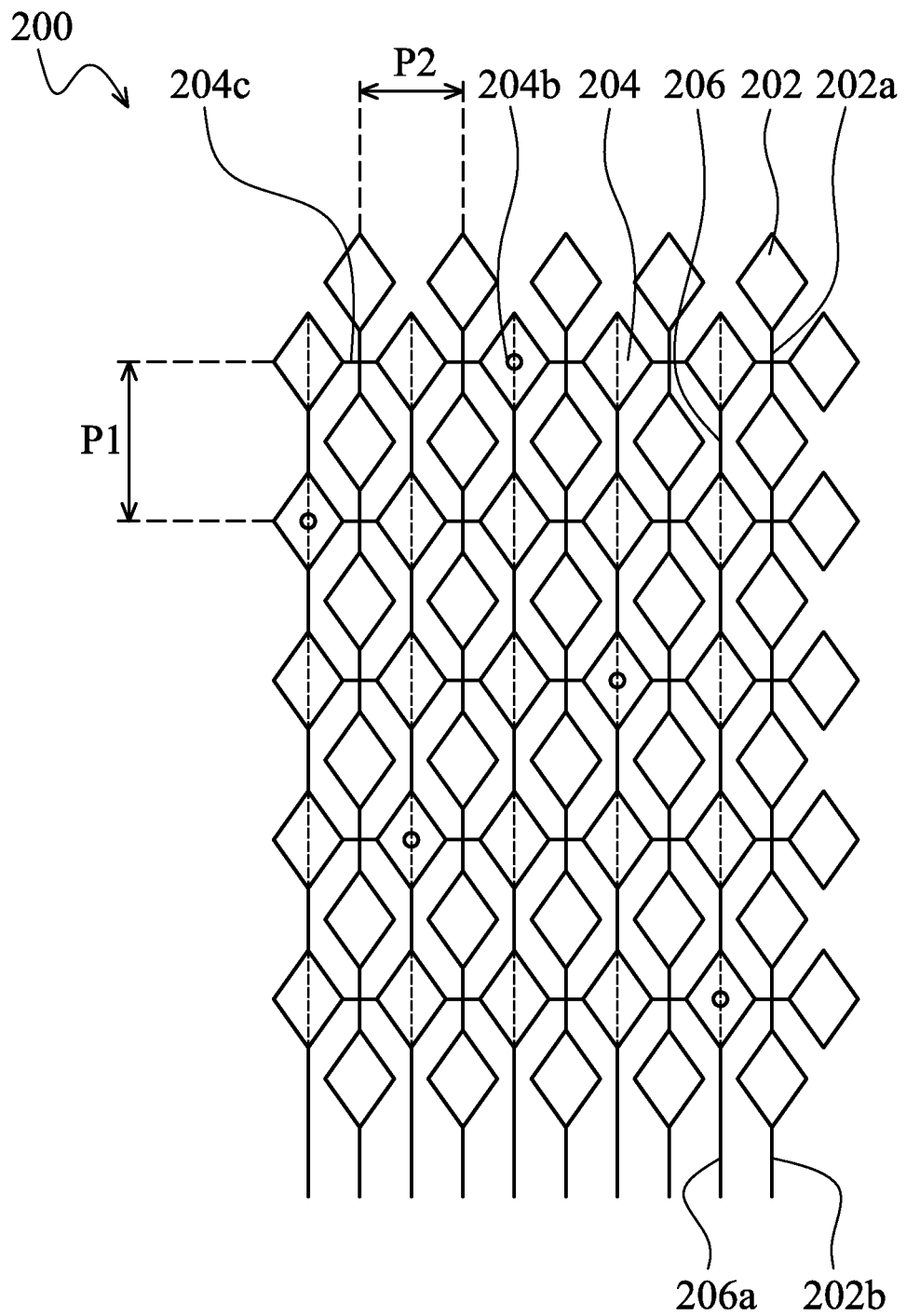
FIG. 3 is a plan view of another embodiment of a system for displaying images including a capacitive touch sensor device according to the invention.
Figure 4:
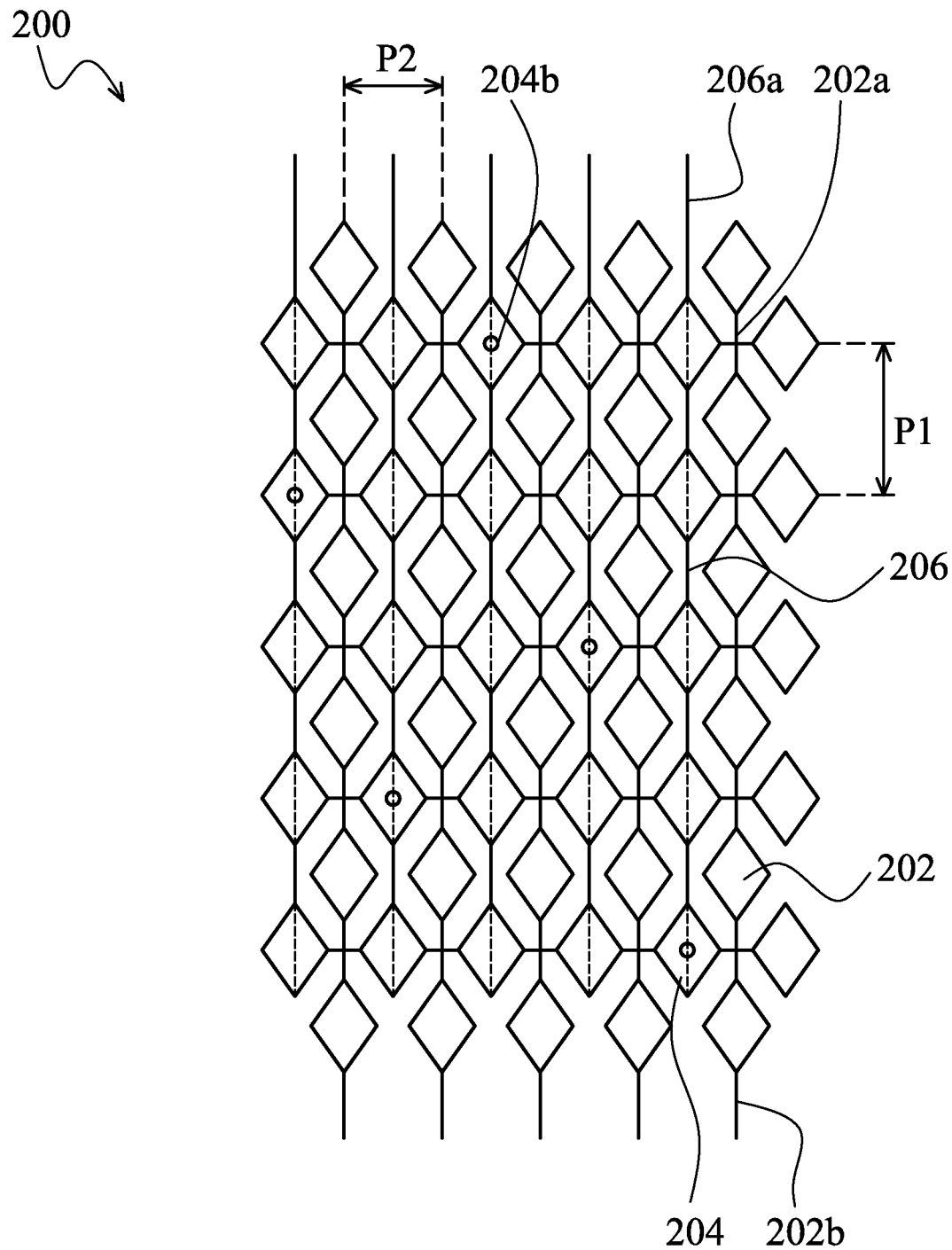
FIG. 4 is a plan view of yet another embodiment of a system for displaying images including a capacitive touch sensor device according to the invention.

Referring to FIGS. 3 and 4, which illustrate various embodiments of a system for displaying images including a capacitive touch sensor device according to the invention. Elements in FIGS. 3 and 4 that are the same as those in FIGS. 2A to 2B are labeled with the same reference numbers as in FIGS. 2A to 2B and are not described again for brevity. In the embodiment shown in FIG. 2A, the touch sensor device 200 has an aspect ratio of 1:1, and thus the pitch P1 of the adjacent series of first sense electrodes 204 is equal to the pitch P2 of the adjacent series of second sense electrodes 202. In the embodiments shown in FIG. 3 or 4, the touch sensor device 200 may not have an aspect ratio equal to 1:1, and thus the pitch P1 of the adjacent series of first sense electrodes 204 is different from the pitch P2 of the adjacent series of second sense electrodes 202. For example, in the embodiments shown in FIG. 3 or 4, the touch sensor device 200 may have an aspect ratio of 4:3 or 16:9, and thus the pitch P1 may be greater than the pitch P2. Additionally, although the plurality of first connection lines 206a and the plurality of second connection lines 202b are located at the same side of the sensing area 203 in the embodiment shown in FIG. 2A, the plurality of first connection lines 206a and the plurality of second connection lines 202b may be located at opposing sides of the sensing area 203, respectively, as shown in FIG. 4. In the embodiment shown in FIG. 4, since the connection lines for electrically connecting the sense electrodes to external circuits can be arranged at opposing sides, rather than orthogonal sides of the sense area of the touch sensor device, the width of the border region around a touch panel display used in portrait mode can be reduced, and thus the dimension of a touch panel display application is also reduced.

Figure 5:
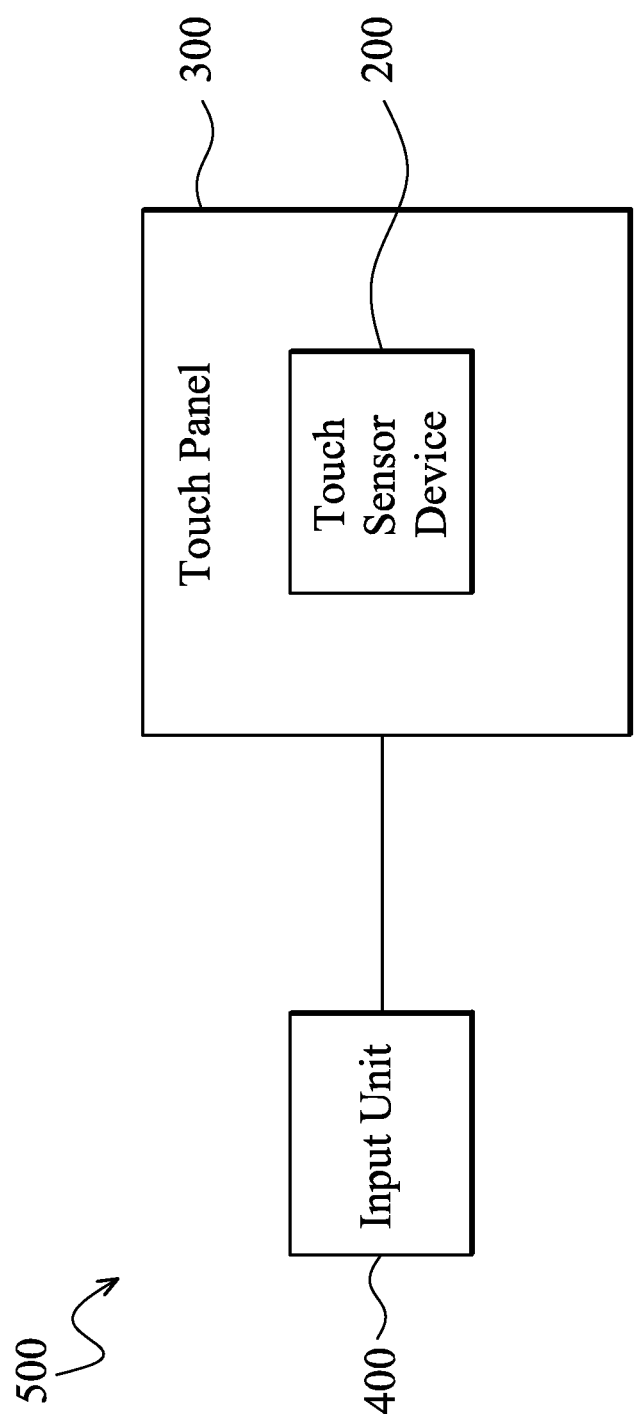
FIG. 5 schematically shows another embodiment of a system for displaying images.

FIG. 5 schematically shows another embodiment of a system for displaying images which, in this case, is implemented as a touch panel display 300 or an electronic device 500 such as a projector, an electronic book, a laptop computer, a mobile phone, a digital camera, a personal digital assistant (PDA), a desktop computer, a television, a car display or a portable DVD player. The described touch sensor device 200 can be incorporated into the touch panel display 300. In some embodiments, the touch sensor device 200 can be incorporated into the electronic device 500. As shown in FIG. 5, the electronic device 500 comprises the touch panel display 300 and an input unit 400. Moreover, the input unit 400 is coupled to the touch panel display 300 and is operative to provide input signals (e.g. image signals) to the touch panel display 300 to generate images.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
   a capacitive touch sensor device, comprising:
      a dielectric layer having a sensing area and covered by a transparent substrate;
      a plurality of series of first sense electrodes and a plurality of series of second sense electrodes embedded in a first level of the dielectric layer and within the sensing area, wherein each first sense electrode in each series of first sense electrodes are electrically connected together along a first direction and each second sense electrode in each series of second sense electrodes are electrically connected together along a second direction substantially different from the first direction; and
      a plurality of signal lines embedded in a second level lower than the first level of the dielectric layer and extending along the second direction, wherein each signal line is correspondingly and electrically connected to one of the first sense electrode of one series of the first sense electrodes and overlapping but without direct electrical connection with one of the first sense electrode of another series of the first sense electrodes.

2. The system of claim 1, further comprising a plurality of first connection lines corresponding to the plurality of signal lines and a plurality of second connection lines corresponding to the plurality of series of second sense electrodes, wherein each first connection line extends from the corresponding signal line to the outside of the sensing area, and each second connection line extends from the corresponding series of second sense electrodes to the outside of the sensing area.

3. The system of claim 2, wherein the pluralities of first and second connection lines are located at the same side of the sensing area.

4. The system of claim 2, wherein the pluralities of first and second connection lines are located at opposing sides of the sensing area, respectively.

5. The system of claim 1, further comprising a common electrode layer embedded in a third level lower than the second level of the dielectric layer and corresponding to the sensing area.

6. The system of claim 5, wherein the common electrode layer is formed of a conductive transparent layer.

7. The system of claim 5, wherein the common electrode layer is electrically connected to a ground or a low impedance electrode.

8. The system of claim 1, wherein the plurality of series of first sense electrodes and the plurality of series of second sense electrodes are formed of the same conductive transparent layer.

9. The system of claim 1, wherein the plurality of signal lines is formed of a conductive transparent layer.

10. The system of claim 1, wherein each signal line passes under one first sense electrode in each series of first sense electrodes.

11. The system of claim 1, wherein each series of first sense electrodes are electrically connected to a ground or a low impedance electrode.

12. The system of claim 1, wherein each signal line is correspondingly and electrically connected to one of the plurality of series of first sense electrodes by an interconnect, wherein the interconnects for each signal line and the corresponding series of first sense electrodes are not arranged in a line as viewed from a top-view perspective.

13. The system of claim 1, wherein the plurality of signal lines and the plurality of series of second sense electrodes are alternately arranged.

14. The system of claim 13, wherein the number of the plurality of series of first sense electrodes is one more than that of the plurality of series of second sense electrodes.

15. The system of claim 13, wherein the number of the plurality of series of first sense electrodes is one less than that of the plurality of series of second sense electrodes.

16. The system of claim 13, wherein the number of the plurality of series of first sense electrodes is equal to that of the plurality of series of second sense electrodes.

17. The system as claimed in claim 1, further comprising:
   a touch panel display comprising the capacitive touch sensor device; and
   an input unit coupled to the touch panel display and operative to provide input signals to the touch panel display, such that the touch panel display displays images.

18. The system of claim 17, wherein the system comprises an electronic device comprising the touch panel display.

19. The system of claim 18, wherein the electronic device is a projector, an electronic book, a laptop computer, a mobile phone, a digital camera, a personal digital assistant, a desktop computer, a television, a car display or a portable DVD player.

20. A system for displaying images, comprising:
   a capacitive touch sensor device, comprising:
      a dielectric layer having a sensing area and covered by a transparent substrate;
      a plurality of series of first sense electrodes and a plurality of series of second sense electrodes embedded in a first level of the dielectric layer and within the sensing area, wherein each first sense electrode in each series of first sense electrodes are electrically connected together along a first direction and each second sense electrode in each series of second sense electrodes are electrically connected together along a second direction by a plurality of connection portions substantially different from the first direction; and a plurality of signal lines embedded in a second level lower than the first level of the dielectric layer and extending along the second direction, wherein the signal lines and the connection portions alternate in substantially parallel directions in the sensing area.

* * * * *